3,256,217
PROCESS FOR MANUFACTURE OF CELLULAR OBJECTS MADE OF THERMOPLASTIC MATERIAL
Yvan Landler, Sceaux, and Pierre Lebel, Rueil-Malmaison, France, assignors to Pneumatiques Caoutchouc Manufacture et Plastiques Kleber Colombes, Colombes, France
No Drawing. Filed Nov. 14, 1962, Ser. No. 237,712
Claims priority, application France, Nov. 14, 1961, 878,938
4 Claims. (Cl. 260—2.5)

The present invention relates to a process for the preparation, in a continuous manner, of rigid cross-linked cellular objects from thermoplastic materials.

By rigid cross-linked cellular objects from thermoplastic materials are meant rigid cellular objects from thermoplastic materials which will not dissolve in the solvents normally used for the thermoplastic material, for instance tetrahydrofuran in the case of polyvinyl chloride.

The processes known to date for the preparation of cellular products, in a continuous manner, are generally characterized by the fact that the formation of the cells takes place at the output of an extruder. However, such prior art processes require a very delicate regulation of the temperature to obtain a sufficiently regular form of the manufactured cellular object.

Additionally, the formation of cells which takes place at the output of the extruder is very brusk and rough, for the expansion of the gases is due to the passage into atmospheric pressure, the material having been subjected to strong internal pressures within the extruder. This expansion translates itself generally by the creation of large cavities whereby the large cells develop more rapidly than the small cells which impairs the homogeneity of the cellular product.

The process according to the present invention remedies these inconveniences.

The process according to the present invention essentially consists in forming, in a continuous manner, with the aid of an extruder or any other analogous machine, a compact and non-cellular product, having already the embryonic form of the object to be prepared. The creation of the cells takes place only in the course of a subsequent phase by reaction between a polyisocyanate which is an ingredient of the extruded mixture and water coming from the outside; by compact product is understood herein a product which is non-cellular and has a density at least equal to 80% of the theoretical density of the initial mixture.

It has been found, in a surprising manner, that the novel process according to the present invention is particularly suitable for preparing rigid cross-linked cellular objects with a base of polyvinyl chloride of which the preparation has been to date essentially discontinuous.

By cellular objects with a base of polyvinyl chloride are meant cellular objects made from mixtures containing between 20 and 80% by weight of polyvinyl chloride.

The classical process for the preparation of rigid cellular objects with a base of polyvinyl chloride as practiced heretofore consists in operating in two stages.

(1) In a first stage or period, a mixture of polyvinyl chloride, of polyisocyanate and of an expanding, foaming or swelling agent is heated and thereupon cooled within a mold under pressure.

By expanding or swelling agent is understood herein a body susceptible to decompose itself under the action of heat while liberating a gas or a body which becomes gaseous under 100° C. at ordinary pressure.

In the course of this operation, the decomposition of the expanding or foaming agent, under the action of the heat, produces a gas which creates an embryonic cellular structure.

(2) The embryonic cellular object is withdrawn from the mold and heated in the presence of water or water vapor. The chemical action of the water on the polyisocyanate present in the mixture leads simultaneously to a new gaseous evolution or discharge, and to a hardening of the material. This action translates itself by an expanding or distending of the embryonic cellular object to the desired dimensions.

Such a process of manufacture is therefore essentially discontinuous since its realization requires the use of molds.

The application of the process according to the present invention to the continuous manufacture of a cross-linked cellular body of polyvinyl chloride necessitates a diminishing or suppressing of the swelling or expanding agents generally utilized heretofore which are generators of gas.

It is nevertheless necessary to have a cellular product which is as homogeneous as possible; this was precisely one of the objects of the first stage of the classical process of preparation of rigid cellular objects of polyvinyl chloride in the course of which was effected the solidification of the polyvinyl chloride.

To obtain a homogeneous formation of cells, the present invention has incorporated into the mixture to be extruded an inert body, finely divided and uniformly distributed, and not, as in the classic prior art process, a swelling or foaming agent. These small solid particles are extruded across the die, and, at the moment of the formation of the gas within the mixture by the action of the water or of the water vapor, they serve as the place of origin for the first gaseous bubbles. These solid particles are preferably porous in order to absorb the gas prior to the formation of the cells; these particles may be of very fine silica or silicates, of glass powder, of cork, of charcoal, or with a base of phenolic resins, such as Bakelite.

The particles play the same regulating role as some grains of pumice stone, added to the bottom of a flask in which boils a liquid.

One of the means for realizing the present invention therefore consists in incorporating these particles into the mixture to be extruded.

The mixtures to which these fine solid particles are added are those already known in the prior art such as those described in the French patent application 844,706, filed November 21, 1960, now French Patent No. 1,310,473, but in which the swelling or expanding agents have been reduced, if not altogether suppressed. If these mixtures do not contain any swelling or expanding agents, it is desirable to add thereto a polymerization catalyst which does not give off any gas, such as benzoyl peroxide and others, to allow the polymerization of the polymerisable monomers.

The reduction or the suppression of these agents which are in general expensive products, and the fact that the novel process is continuous, are two very important economic factors which prove the practical interest of the present invention.

Accordingly, it is an object of the present invention to provide a method for manufacturing rigid cross-linked cellular objects of thermoplastic materials which obviates the shortcomings and inadequacies encountered with the prior art, in particular, the inability to adapt the prior art process to continuous manufacturing techniques.

It is another object of the present invention to provide a process for the continuous manufacture of rigid cross-linked cellular objects made of thermoplastic materials which does not require any delicate control in the temperature and which assures a highly regular cellular object as final product.

Still a further object of the present invention resides in the provision of a method for producing, in a continuous manner, cross-linked cellular objects made of thermoplastic materials which exhibit a high degree of homogeneity.

A further object of the present invention resides in the provision of a continuous process for the manufacture of rigid cellular objects made of thermoplastic material which is relatively inexpensive and considerably more economic than the prior art methods.

These and other objects, features and advantages of the present invention will become more obvious from the following description of typical examples, described herein only for illustrative purposes.

Since the mixtures mentioned hereinabove that may be used with the present invention have to be extruded in the compact and non-cellular state, it is recommended in accordance with the present invention to utilize a degassing extruder.

The die has the shape of the object to be prepared which may be a plate, a tube which, sectioned and expanded may serve in the manufacture of lifebuoys, a gutter, a bar, or a round bar which after being cut and expanded may serve in the manufacture of floating balls for fishing nets and similar items.

The extruded mixture must also contain a polyisocyanate susceptible to react with the water or the water vapor with the formation of gas. Such polyisocyanates, as currently employed in the manufacture of cellular polyvinyl chloride are the 2,4-diisocyanate of toluene, the 2,6-diisocyanate of toluene and mixtures thereof. Any organic isocyanate is suitable, provided that it contains 2 or more isocyanate functions. The mixture contains between 10 and 40% by weight, preferably between 20 and 30% by weight of the polyisocyanate.

This reaction with the water or with the water vapor must take place, either within a hot water trough or within an oven in a continuous or discontinuous manner.

*Example 1*

Two mixtures 1 and 2 of which the compositions are as follows are subjected to the process according to the present invention, the compositions of these mixtures being given in parts by weight.

| Ingredients | Mixture 1 | Mixture 2 |
|---|---|---|
| Polyvinyl chloride | 51 | 51 |
| 2-4 diisocyanate of toluene | 28 | 28 |
| Azobis-isobutyronitrile | 5 | |
| Maleic anhydride | 10 | 10 |
| Acrylonitrile | 6 | 6 |
| Finely divided silica | | 4 |
| Benzoyl peroxide | | 1 |

These two mixtures are introduced into an extruder having a screw diameter of 30 mm., of which the input temperature is maintained at 150° C. and the output temperature is maintained at 180° C. These mixtures are thereupon extruded through a rectangular die of 10 cm. x 1 cm., followed by a cold form, with an output or at a rate of 6 kg. per hour.

Under these conditions, the densities of the mixtures 1 and 2, after extrusion, are respectively 0.7 and 1.2 kg./cm.$^3$. The mixture 1 is already in cellular structure and consequently not in the scope of the present invention. The mixture 2 is essentially compact, and devoid of cells.

The two products are thereafter subjected to the action of water vapor within an oven. At the output of the oven, the mixture 1 has irregular dimensions and is deformed which makes it difficult to measure its dimensions, whereas the mixture 2 appears in the form of a regular block of cross section 30 cm. x 3 cm. and of density 0.038 kg./cm.$^3$.

The cellular product obtained with the mixture 2 is insoluble in tetrahydrofuran, a solvent of polyvinyl chloride.

The amount of azobis-isobutyronitrile used in the mixture 1 is too high to allow to get a final homogeneous cellular body.

*Example 2*

Two mixtures 3 and 4 of which the compositions are as follows are subjected to the process according to the invention, the compositions of these mixtures being given in parts by weight.

| Ingredients | Mixture 3 | Mixture 4 |
|---|---|---|
| Polymethylmethacrylate | 60 | 60 |
| 2-6 diisocyanate of toluene | 20 | 20 |
| Azobis-isobutyronitrile | 0.5 | |
| Maleic anhydride | 8 | 8 |
| Acrylonitrile | 8 | 8 |
| Bone char | 3.5 | 3.5 |
| Lauroyl peroxide | | 0.5 |

The two products obtained with these mixtures after extruding in the same conditions as described in Example 1 have respective densities of 1.06 and 1.09 kg./m.$^3$.

After the action of hot water in a trough, the mixtures both have a density of 0.06 kg./m.$^3$. The mixture 4 has a more regular form.

These two cellular products are both insoluble in benzene, which is a solvent of polymethylmethacrylate.

It is noted that so low amounts of expanding agent, as in mixture 3, give a compact and substantially non-cellular body, the use of which is thus as an initiator of the polymerization of the monomers present in the mixture.

While we have described typical examples of our process, it is understood that the same is not limited thereto, but is susceptible of many changes and modifications within the spirit and scope of the present invention as known to a person skilled in the art. For example, while the present invention is of particular interest to the continuous manufacture of rigid cross-linked cellular objects from polyvinyl chloride, it is also applicable to the preparation of cross-linked rigid cellular objects from other thermoplastic materials, such as homopolymers and interpolymers of monomeric compounds containing the $CH_2=C<$ grouping such as olefins, e.g., ethylene, isobutylene; vinyl halides, e.g., vinyl chloride, vinylidene chloride; vinyl esters of carboxylic acids, e.g., vinyl acetate, vinyl butyrate, vinyl stearate, vinyl benzoate; unsaturated carboxylic acids and derivatives thereof, e.g., acrylic acid, methacrylic acid, methyl acrylate, ethyl acrylate, methyl methacrylate, acrylamide, acrylonitrile, methacrylonitrile, and interpolymers of the abovementioned vinylidene monomers with unsaturated alpha, beta-unsaturated polycarboxylic acids and derivatives thereof, e.g., maleic anhydride, diethyl maleate, dibutyl fumarate, diallyl maleate, dipropyl maleate, etc. In general, optimum results are obtained with rigid, relatively non-elastic thermoplastic resins such as homopolymers and interpolymers of vinyl chloride, homopolymers of vinylidene aromatic hydrocarbon compounds and ring halogenated derivatives thereof, e.g. styrene, o-chlorostyrene, p-chlorostyrene, 2,5-dichlorostyrene, 2,4-dichlorostyrene, p-methylstyrene, p-ethylstyrene, vinyl naphthalene, alpha-methylstyrene, and interpolymers of such vinylidene aromatic hydrocarbon compounds with other vinylidene monomers in which the interpolymer contains at least 70% of the vinylidene aromatic hydrocarbon compound. The mixture generally contains between 20 and 80% by weight of this thermoplastic material.

Typical examples of monomers which are suitable in the mixture used in the process of the present invention are vinylidene aromatic hydrocarbon compounds, such as styrene and derivatives thereof, unsaturated carboxylic acids and derivatives thereof such as methyl methacrylate, acrylonitrile, ethyl acrylate, vinyl esters of carboxylic acids such as vinyl acetate, vinyl benzoate. The mixture generally contains between 0.5 and 60% by weight of these monomers.

Typical examples of polymerizable carboxylic anhydrides are acrylic anhydride, citraconic anhydride, itaconic anhydride and maleic anhydride. The mixture generally contains between 0.5 and 20% by weight of such polymerisable anhydrides. Thus, it will be obvious to those skilled in the art that the present invention is susceptible of numerous variations and modifications within the spirit and scope thereof, and we therefore do not wish to be limited to the details shown and described herein, but intend to cover all such changes and modifications as are encompassed by the scope of the appended claims.

We claim:

1. A process for the continuous manufacture of cross-linked cellular products of thermoplastic materials which comprises extruding, in the course of a first phase, a mixture comprising 20 to 80% by weight of a thermoplastic material selected from the group consisting of the homopolymers and interpolymers of monoolefins, vinyl halides, vinylidene halides, vinyl esters of saturated carboxylic acids, unsaturated carboxylic acids, esters of unsaturated carboxylic acids, acrylamide, acrylonitrile and methacrylonitrile and 10 to 40% by weight of an organic polyisocyanate, said mixture being substantially devoid of an expanding agent, to give a substantially non-cellular product having the embryonic form of the desired product, and thereupon creating cells within the extruded product, in the course of a second phase, by reacting a substance selected from the group consisting of water and water vapor with the extruded product.

2. The process of claim 1, wherein the thermoplastic material is polyvinyl chloride.

3. A process for the continuous manufacture of cross-linked cellular products of thermoplastic materials which comprises extruding, in the course of a first phase, a mixture comprising 20 to 80% by weight of a thermoplastic material selected from the group consisting of the homopolymers and interpolymers of monoolefins, vinyl halides, vinylidene halides, vinyl esters of saturated carboxylic acids, unsaturated carboxylic acids, esters of unsaturated carboxylic acids, acrylamide, acrylonitrile and methacrylonitrile, 10 to 40% by weight of an organic polyisocyanate, and finely divided, inert bodies uniformly distributed therein, said mixture being substantially devoid of an expanding agent, to give a substantially non-cellular product having the embryonic form of the desired product, and thereupon creating cells within the extruded product, in the course of a second phase, by reacting a substance selected from the group consisting of water and water vapor with the extruded product.

4. The process of claim 3, wherein the thermoplastic material is polyvinyl chloride.

References Cited by the Examiner

UNITED STATES PATENTS

| | | | |
|---|---|---|---|
| 2,576,749 | 11/1951 | Carpentier | 260—2.5 |
| 2,819,231 | 1/1958 | Hahn et al. | 260—2.5 |
| 2,850,467 | 9/1958 | Livingood | 260—2.5 |
| 3,026,273 | 3/1962 | Engles. | |

FOREIGN PATENTS 660,358  11/1951  Great Britain.

OTHER REFERENCES

Barringer: "Rigid Urethane Foams, 11, Chemistry and Formulation," Du Pont Bulletin Hr–26, April 1958, pp. 9–12.

LEON J. BERCOVITZ, *Primary Examiner.*

DONALD E. CZAJA, *Examiner.*

J. J. KLOCKO, *Assistant Examiner.*